United States Patent [19]
Lahti

[11] Patent Number: 6,042,730
[45] Date of Patent: Mar. 28, 2000

[54] CAR WASH WASTEWATER TREATMENT

[76] Inventor: William J. Lahti, 8 Brookview Ct., Stony Brook, N.Y. 11790

[21] Appl. No.: 09/151,990

[22] Filed: Sep. 11, 1998

Related U.S. Application Data

[63] Continuation-in-part of application No. 08/805,881, Mar. 3, 1997, Pat. No. 5,807,487.

[51] Int. Cl.[7] .............................. B01D 21/01; C02F 1/52
[52] U.S. Cl. ........................... 210/667; 210/724; 210/726
[58] Field of Search .................................. 210/665, 667, 210/683, 709, 724, 726, 743

[56] References Cited

U.S. PATENT DOCUMENTS

| | | | |
|---|---|---|---|
| 3,595,393 | 7/1971 | Messa ...................................... | 210/206 |
| 5,433,863 | 7/1995 | Braden et al. ........................... | 210/708 |
| 5,529,696 | 6/1996 | Tibbitts .................................... | 210/724 |
| 5,707,514 | 1/1998 | Yamasaki et al. ....................... | 210/665 |
| 5,885,459 | 3/1999 | Lerche et al. ............................ | 210/602 |

FOREIGN PATENT DOCUMENTS

| | | |
|---|---|---|
| 3344275 | 6/1985 | Germany . |
| 50091951 | 7/1975 | Japan . |
| WO 9610540 | 4/1996 | WIPO . |

*Primary Examiner*—David A. Simmons
*Assistant Examiner*—Frank M. Lawrence
*Attorney, Agent, or Firm*—Lackenbach Siegel Marzullo Aronson & Greenspan, P.C.

[57] ABSTRACT

A method and apparatus for treating wastewater effluent from a commercial car wash provides for collecting and holding the effluent in a first tank for equalization and to a pH of about 7.0 to 9.5, and then transferring the equalized wastewater to a second tank for either caustification or acidification to a first predetermined pH of up to 10.0, and preferably 8.2 to 8.6, and most preferably 8.4, and then adding a coagulant, preferably a polyaluminum chloride (PAC) with a basicity of 45 to 50% at 400 to 600 ppm, to a second predetermined pH of 6.2 to 7.0 and preferably 6.6 to 7.0, and most preferably 6.8, to effect coagulation at the second pH to form treated water and a sludge. The treated water is decanted from the sludge and filtered to remove 1 to 50 micron particulates. The filtered water is acidified and then passed through a weak base anion exchange resin to remove MBAS to provide treated water. The treated water has substantially removed heavy metals, VOCs and oil and grease to meet the present day stringent environmental standards for discharge to subsurface aquifers, surface or for reuse or recycle. This treatment has first and second treatment tanks in essentially an automated, continuous flow, in-structure, in-ground insulated tank system, in a non-toxic, moderate pH environment with minimal downtime and with cost effective maintenance, and which eliminates outside treatment or discharge of environmentally proscribed wastewater. The treated water may optionally be subsequently filtered such as by carbon adsorption, and sanitized such as by ozonation, and then recycled as feedwater to the car wash, thereby reducing water and energy costs.

17 Claims, 2 Drawing Sheets

CAR WASH WASTEWATER TREATMENT

PRIOR RELATED APPLICATIONS

This is a continuation-in-part of application Ser. No. 08/805,881, filed Mar. 3, 1997, now U.S. Pat. No. 5,807,487.

BACKGROUND OF THE INVENTION

1. Field of the Invention

The present invention relates to the treatment of wastewater effluent from a commercial car wash.

2. Background and Discussion of the Prior Art

Commercial car wash operations desire to discharge their effluent to subsurface aquifers, or to the surface, or reuse the treated water as feedwater. Present day state and local environmental restrictions place severe limitations on the organic matter, solids, volatile organic compounds (VOC) and heavy metals permitted to be discharged to the environment. Car wash businesses desire an effluent treatment system which meets these present day rigorous environmental standards and yet permits essentially continuous operation with minimal downtime, and in which maintenance is achieved in a practical manner with minimal cost by persons of limited technical skill.

Environmental agencies in various locales throughout the country have recently set and enforced rigorous maximum discharge criteria standards for commercial wastewater. Car washes in certain locales face particularly stringent wastewater effluent permissible maximums. For example, the New York State Department of Environmental Conservation (NYSDEC) Regulation, Title 6, Chap. X, Section 703.6, eff Jan. 9, 1994 provides such stringent effluent standards, particularly for heavy metals found in car wash effluent, as well as for oil and grease, pH as follows:

TABLE 1

| Substance | Maximum Allowable Concentration (micrograms/liter, ug/l) |
| --- | --- |
| Barium | 2,000 |
| Cadmium | 20 |
| Chromium (hexavalent) | 100 |
| Copper | 1,000 |
| Foaming agents[1] | 1,000 |
| Iron[2] | 600 |
| Lead | 50 |
| Manganese | 600 |
| Nickel | 2,000 |
| Oil and Grease | 15,000 |
| pH | See Note 3 |
| Zinc | 5,000 |

Notes.
1. Foaming agents determined as methylene blue active substances (MBAS) or other tests as specified by the commissioner.
2. Combined concentration of iron and manganese shall not exceed 1000 ug/L.
3. pH shall not be lower than 6.5 or the pH of the natural groundwater, whichever is lower, nor shall be greater than 8.5 or the pH of the natural groundwater, whichever is greater.

Commercial car washes peculiarly face gasoline residues which are found in the effluent and must also be removed. These gasoline residues particularly include the volatile organic compounds (VOC): toluene, xylene (per monomer), ethyl benzene and benzene. Thus, car wash operations were required, pursuant to NYSDEC Regulation, Title 6, Chap. X, Sections 703.6, 702.16(c)(1) and 702.15, to reduce such volatile organics in the discharge effluent to the following limits:

TABLE 2

| Volatile Organic (VOC) | Maximum Allowable Concentration (parts per billion, ppb) |
| --- | --- |
| Toluene | 5 |
| Xylene (per monomer) | 5 |
| Ethylbenzene | 5 |
| Benzene | 0.7 |

The effluent from car wash operations varies substantially, particularly on whether and to what degree there is recycle. A typical car wash discharge however has the following typical concentrations and range of concentrations:

TABLE 3

| Substance | Concentration Ranges (parts per million, ppm) |
| --- | --- |
| MBAS | 3–40 ppm |
| TSS | 50–250 ppm |
| Oil and Grease | 10–200 ppm |
| pH | 7–9.5 |
| Barium | 0.15–0.30 ppm |
| Lead | 0.02–0.30 ppm |
| Chromium | 0.05–0.30 ppm |
| Cadmium | 0.02–0.15 ppm |
| Manganese | 0.10–2.0 ppm |
| Copper | 0.10–0.40 ppm |
| Zinc | 0.30–3.0 ppm |
| Iron | 0.50–20.0 ppm |
| Volatile Organics (VOC) | 300–600 ppm total |

"MBAS" refers to "methylene blue active substances" and "TSS" refers to "total suspended solids", as determined by conventional testing methods well-known to those skilled in the art. "FOG" refers to "fats, oils and greases". "Oil and grease" is understood to mean essentially "FOG".

The present day car wash operations were thus faced with the daunting task of reducing not only the oil and grease as was the earlier concerns, but also substantially reducing heavy metal concentrations, VOCs and MBAS.

Typical early, and now apparently impractical, prior art approaches were to use generalized wastewater treatments, deemed suitable for a wide range of commercial or industrial operations. One such early attempt for both a car wash and laundry treatment is disclosed in U.S. Pat. No. 4,104,164, granted Aug. 1, 1978, to Chelton. Chelton disclosed a generalized approach to wastewater treatment, which provided for a first stage treatment by a weir or gravity filtration of the effluent followed in seriatim by centrifugation, activated carbon adsorptive filtration, bag filtration and particulate filtration. While Chelton describes the treatment as being suitable for both car wash and laundries, the present day discharge standards particularly as to certain heavy metals appear to render the Chelton and like laundry treatment systems unsuitable. By way of example, due to the types and concentrations of heavy metal contaminants in solution and required to be removed in present car wash operations, the Chelton primary reliance on centrifugation and filtration would be misplaced. Another prior art method use for both laundry and car wash wastewater treatment is Arnaud, U.S. Pat. No. 5,647,977. Arnaud discloses mixing/flocculating as a treatment step. The laundry/car wash prior art methods were not generally directed to the removal of heavy metals in diverse concentrations.

The present day car wash art thus desired a method and apparatus for treating its wastewater effluent to remove substantial heavy metals as well as FOGs in an essentially continuous operation, in a non-toxic, moderate pH environment, and with minimal maintenance and downtime, and yet importantly meet the present day stringent environmental discharge standards. The present invention provides that desired result.

SUMMARY OF INVENTION

The term "equalization" or "equalizing" as used hereinbefore and hereinafter throughout the specification and claims refers to car wash effluent collection and retention in a large tank so as to average out the variations and permutations in the nature and concentration of the effluent and to further provide a relatively consistent pH value for further treatment of the wastewater.

In broad terms, the present invention is a method and apparatus in which caustification or acidification of the effluent is to a first predetermined pH and then a coagulant is added to the wastewater at the first pH to effect a second predetermined pH and in turn effect coagulation at the second pH to provide nascent treated water and a sludge. The treated water is filtered, acidified and then passed through a weak base anion exchange resin to remove MBAS. The pH is finally adjusted to about neutral. The finally treated water meets the afore-discussed environmental standards.

In more specific terms, the present invention comprises a method and apparatus for the treatment of wastewater effluent from a commercial car wash wherein the effluent is collected in a first tank for equalization at a typical pH of between 7.0 to 9.5 and then passed to a second tank for caustification or acidification to a first pH of not more than about 10.0, and preferably from about 8.2 to 8.6, and most preferably 8.4, and then a coagulant, preferably a polyaluminum chloride (PAC) with a basicity of 45 to 50%, is added at 400 to 600 ppm to a second pH of 6.2 to 7.0, preferably 6.6 to 7.0, and most preferably 6.8 to in turn effect coagulation at the second pH, to form treated water and a sludge. The treated water is removed from the coagulation tank, filtered to remove 1 to 50 micron particulates, acidified to a pH of 5.4 and passed through weak base anion exchange resin bed to remove MBAS. The treated water is then finally pH adjusted with a basifying agent to be in conformance with e.g. NYSDEC, Title 6, Chap. X, Section 703.6, note 3. This finally treated water meets the afore-discussed environmental standards for surface or sub-surface discharge, or optionally may be further treated by, optionally, carbon adsorption, deionization and sanitized such as by ozonation or UV treatment for recycle as feedwater to the car wash. With recycle, the resin bed and acidifying agent treatments may not necessarily be required.

DESCRIPTION OF THE PREFERRED EMBODIMENTS

Figure 1A:
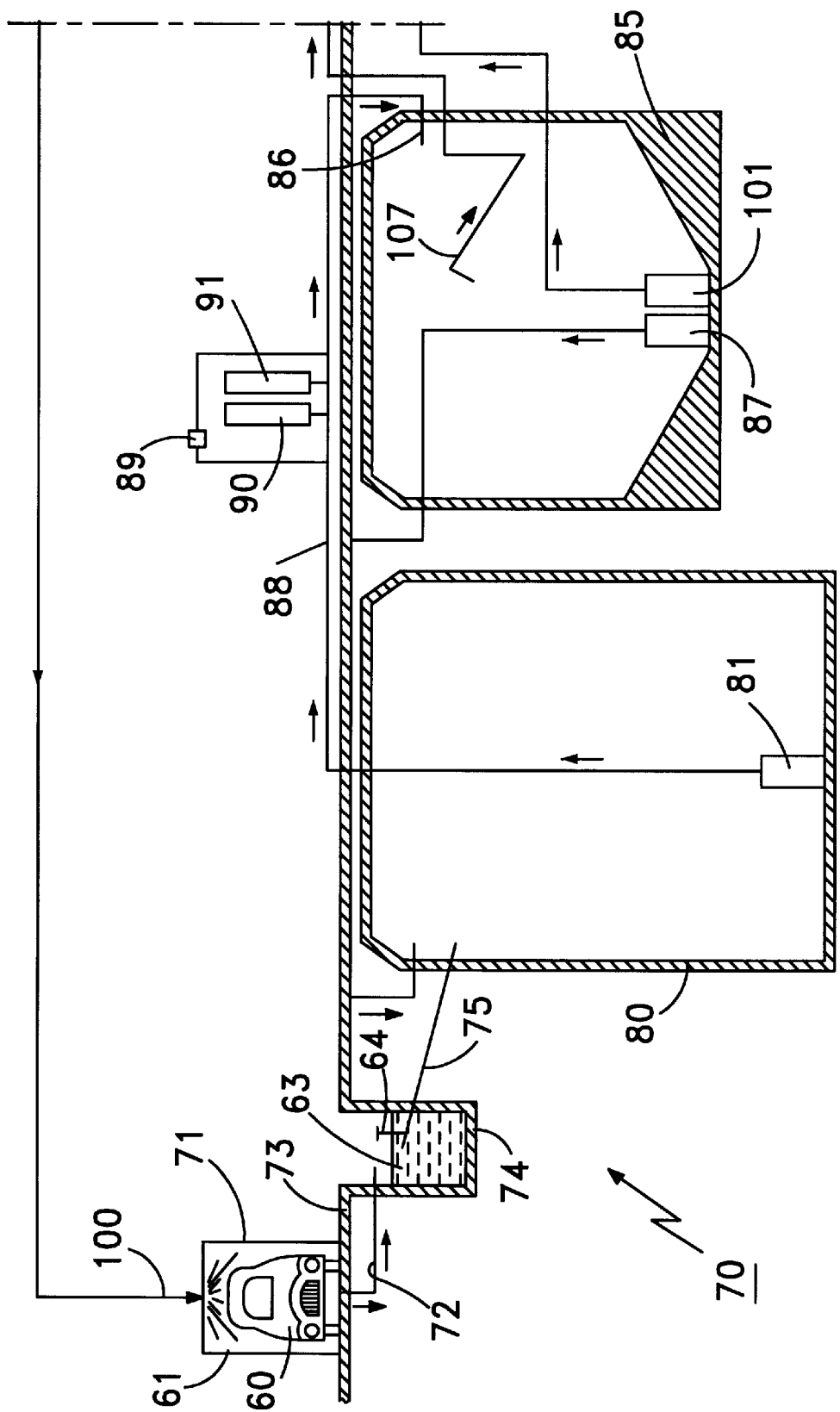
FIGS. 1A and 1B are a composite flowsheet illustration of the wastewater treatment system of the present invention.
Figure 1B:
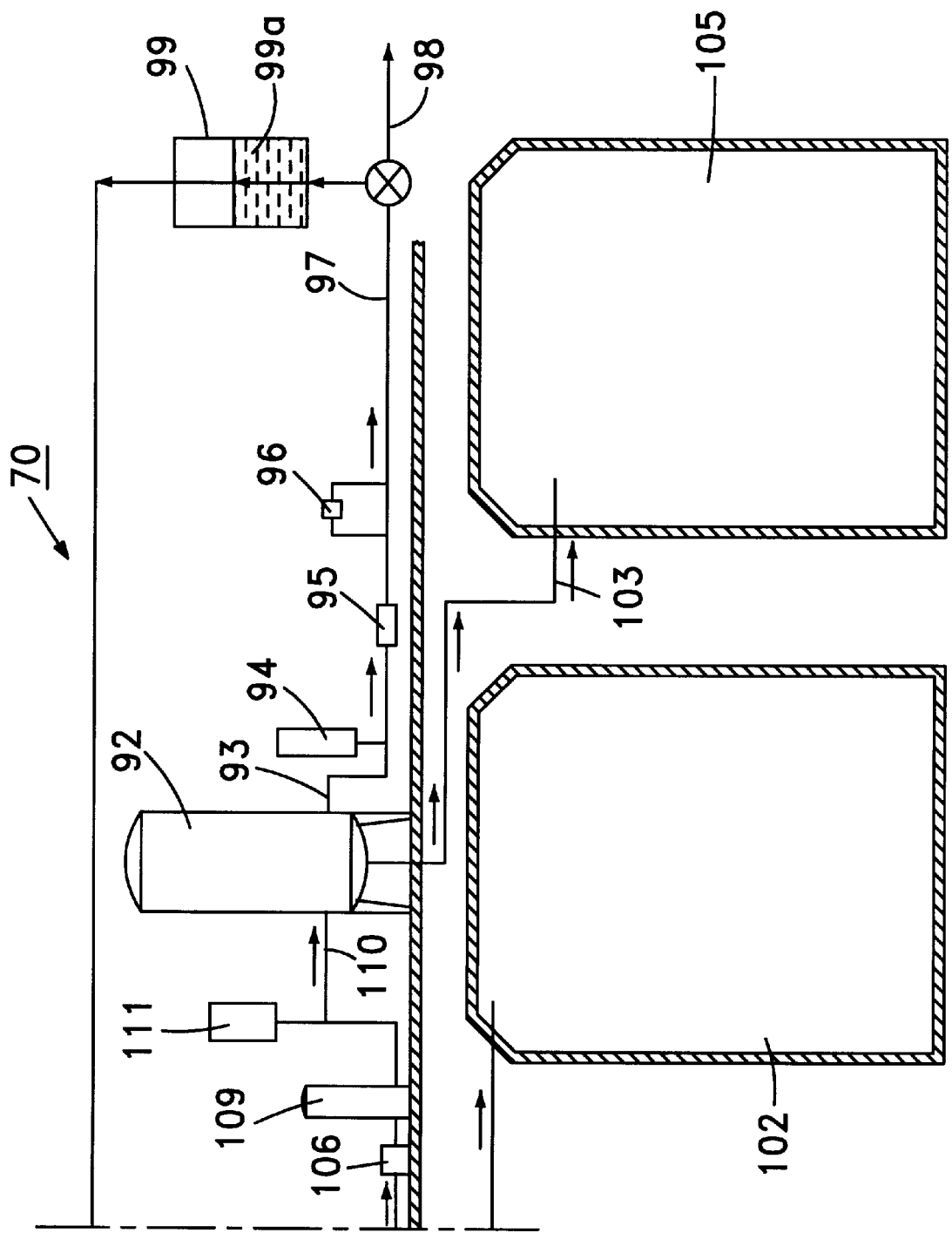

Referring to FIGS. 1A and 1B, there is shown the car wash wastewater treatment of the present invention 70. The commercial car wash is generally designated as 71, depicting car 60 in wash tunnel 61, with wastewater effluent 72 being discharged from car wash 71. The effluent, typically, has the characteristics as previously described. The wastewater effluent gravity flows below ground level 73 to a trap 74. Trap 74 is designed to settle out or remove grit and sand.

The water in trap 74 is transferred from just below the surface level by tee connection 64 in trap 74, via a gravity feed sloping feed line 75 below ground level to in-ground equalization tank 80. Wastewater from trap 74 is collected and held in tank 80 so that all the wastewater including the last collected wastewater is held in tank 80 for at least about ½ hour or more. It was found that this time was desirable for diverse characteristics such as detergent and metal types, concentration, as well as temperature to equalize, and the entire contents of the tank would then be at a specific pH of about 7.0 to 9.5 and at a uniform temperature. This equalization is for the controlled treatment of the large and diverse effluent volumes. After equalization, pump 81 transfers the equalized wastewater to batch treatment tank 85 as at inlet 86. Tank 85, like tank 80, is in-ground for insulation for operating at a more uniform temperature absent such in-ground construction, and to better utilize above-ground valuable-commercial space.

Tank 85 is filled to a pre-determined level at which level float actuation switch (not shown) actuates pump 87 to recirculate the water through line 88. A pH sensor or controller 89 such as manufactured by LMI, Milton Roy, Model No. DP5000-1A-0, as is well known in the art. The controller 89 senses the pH and actuates caustic or acidifying agent supply or feed 90 to add an agent such as caustic soda or sulfuric acid to line 88. The caustification or acidification continues until a predetermined pH up to about 10.0, preferably about 8.2 to 8.6, and most preferably about 8.4, is attained at which point the caustic or acidific feed 90 is shut off by controller 89. Coagulant supply or feed 91 is then actuated to feed an acidifying coagulant, particularly a metal-halo coagulant and preferably a polyaluminum chloride (PAC) to line 88 and then into tank 85. The coagulant is added until the pH controller sensor 89 senses a pH of about 6.2 to 7.0, preferably 6.6 to 7.0, and most preferably 6.8, which then activates shut down of the coagulant supply 91 and pump 87. The pH specific water-coagulant mixture is allowed to settle for a minimum predetermined time of at least 1 hour, and preferably up to 3 hours or more. After the termination of the pre-set coagulation time, self-priming pump 106 is automatically actuated to decant the nascent water by float arm 107 to remove the water from the coagulated sludge and from tank 85.

The removed water is pumped to cartridge filter 109 for removal of 1 to 50 micron particulates. The cartridge filter is preferably 20 micron rated. A Harmsco HIF24 is the preferred cartridge filter. The filtered water 110 is then pH adjusted by acidifying agent addition 111, and then passed through ion exchange resin tank 92 which is packed with a weak base anion exchange resin to remove MBAS and organics. One most preferred weak base anion exchange resin is WBMP resin in sulfate form manufactured by Resintech, Inc. The treated water 93 is acidic and then, if required, mixed with caustic from caustic feed 94 in in-line mixer 95. A pH sensor controller 96, such as afore-described senses the pH after mixer 95 and when the pH is 6.8 to 8.5, and preferably about 7.0, the caustic feed is shut off. This provides continuous monitoring and regulation of the pH of the treated wastewater. The treated wastewater at 97 is within the maximum discharge requirements as previously described.

This treated wastewater may be pumped as at 98 directly to subsurface aquifers or surface discharge to leaching pools (not shown) or, optionally, may be treated by carbon adsorption 99a, deionization, and sanitized by ozone generation or ozonator 99 for recycle as feedwater 100 to car wash 71. One suitable ozone generator for ozonation of the treated water for recycle feedwater is shown and described in U.S. Pat. No. 5,097,556 issued Mar. 24, 1994 to Engel et al.

The ion exchange resin must periodically be cleaned. The weak base ion exchange resin is cleaned with back wash and acid (optional) to remove PAC-reactant contaminants, and then 2 to 4% caustic added and then the caustic is flushed, and 2 to 4% sulfuric acid added, and finally flushed until the pH of the wash is about 4 to 5.

After decanting the nascent water from tank 85 to effect a predetermined lower level in the tank, a level switch is actuated to shut off self-priming pump 106 and simultaneously actuate sludge pump 101 to pump the sludge to sludge holding tank 102. The sludge is then further settled out and removed by septic tank handlers for off-site disposal. The waste regenerative solution 103 from ion exchange resin tank 92 is collected in tank 105 and likewise periodically removed by commercial septic tank handlers for off-site disposal.

In the aforesaid manner, wastewater typically is collected in the equalization tank 80. The collected and equalized wastewater typically has a pH of from about 7.0 to 8.4. The equalized wastewater is dosed with caustic until a pH of from about 8.2 to 8.6, and most preferably 8.4, is attained. While it is within the contemplation of the invention to operate at a pH up to about 10.0, it has been found according to the present invention, that at a pH of 8.4, many of the heavy metals, such as Cr, Pb, Ba, Zn and Cd, will substantially precipitate out from the car wash effluent. The PAC coagulant is most preferably at 400 to 600 ppm, and at that preferred concentration is particularly effective wherein the starting pH is 8.4. If the starting pH is significantly different, there was found to be no or poor coagulation.

When the batch is at the desired pH of 8.4, it is held at that level for approximately 10 minutes to ensure that the desired pH is attained. The coagulant, preferably a polyaluminum chloride (PAC) is added at 400–600 ppm. The batch is recirculated until the pH is stabilized at 6.2 to 7.0, and most preferably 6.8.

With completion of the PAC coagulant addition, coagulation is effected, and the batch is allowed to settle out. While the coagulation times may vary, it has been found pursuant to the present invention, that the majority of the floc settles within 1 hour but at least about 2–3 hours is required to complete the coagulation. It has surprisingly been found that by process of the present invention, after coagulation, substantially all the suspended solids, heavy metals, FOG, VOCs and a significant portion of the MBAS are removed.

While it has been found that the decanted wastewater from batch tank 85 may surprisingly typically meet the afore-discussed rigorous environmental standards, the use of ion exchange resin bed 92 is most desired. The use of cartridge filter 109 upstream of the ion exchange resin bed 92 protects the ion exchange bed from clogging contaminants. The ion exchange resin bed 92 removes residual MBAS and organics. In recycling, the wastewater is acidified at 111 to ensure that the feed 110 to bed 92 has a pH of about 5.4. The resin bed 92 typically reduces the MBAS from a level of 5 ppm to 1 ppm or less. The treated wastewater exits bed 92 at a pH of about 5.4. The exit treated water 93 is then treated with caustic soda at a concentration of 25% to 50% to adjust the pH to approximately 7.0 for discharge at 98.

Where the wastewater is recycled, the treated wastewater may optionally be passed through a carbon adsorption stage 99a, and in any event desirably sanitized in an ozonation stage 99. Deionization may also be utilized. The recycled water saves water and energy costs and is therefore one preferred mode of the invention.

The wastewater from the car wash operation 71 flows off the cars to an open pit or trap 74 disposed below the wash tunnel or bay 61. There may be one or two traps 74 depending upon whether or not the car wash is set up to segregate wash water and rinse water. The trap 74 may be a concrete box approximately 3'×4'×4' deep with a steel open type grate cover on it. The purpose of the trap is to collect the heavy grit from the cars 60.

Trap 74, more specifically considered, may be an in ground rectangular pit most likely made of reinforced concrete. The volume will range from 200 gallons to 500 gallons depending upon space between the car wash tracks and other site specific conditions. A significant factor to the volume requirement is to minimize grit carryover from trap 74. The gravity outlet pipe 75 may be equipped with a drop tee 64 at the upstream end. The drop tee 64 is a conventional tee fitting fastened to the pipe such that one branch of the tee 64 is above the water level 63. During normal operation, the water will flow out of the grit chamber via entering the bottom branch of the tee 64. The actual level of liquid within the chamber is approximately ½ way up the length of the tee. Material floating on the surface of the liquid, such as hydraulic oil as when a hose ruptures, will be substantially contained within the grit chamber because it would have to descend into the more dense water and then up through the bottom branch of the tee to get out of the chamber or trap 74. Oils typically remain on top of the water surface and would, of course, not readily downwardly flow. The gravity flow pipe 75 is sloped downwardly to equalization tank 80.

The wastewater leaves the trap via the gravity flow pipe 75. The pipe 75 is set at mid level or near the top of the trap so that the grit will settle out and remain within it. The trap 74 or grit chamber is periodically cleaned out by the facility operator using a shovel or other means to remove the collected grit. The pipe 75 from the trap or grit collection chamber 74 is connected to equalization tank 80. The wastewater remains in the equalization tank where it homogenizes until the system is ready to pump it into empty batch tank 85.

The equalization tank may be one or more solid underground, reinforced concrete tanks. Typical volumes fall in the range of 10,000–30,000 gallons holding capacity. The tanks are typically internally coated as they must be watertight. When more than one tank is used they are connected through eight inch diameter PVC pipes at the base of the tanks. The main tank that houses the pump and floats is typically set one foot below the others so that the other tanks drain almost entirely into the main tank as residual wastewater in the holding tanks is not desirable. The main tank typically has (1) 4" diameter PVC inlet pipe from the gravity overflow pipe of the grit collection chamber, (1) 2" diameter fresh air vent, and (1) 2" diameter PVC pipe from the submersible pump within the equalization tank back to the filtration room or directly to the batch tank. There is typically one submersible pump within the main tank. The pump is installed using flexible PVC piping up to a check valve just below the manhole cover at grade. The flexible PVC pipe makes removal of the pump easy as the pump can be lifted from the tank using a rope tied to the pump at the time of initial installation. Valving is used to control back-feeding into the equalization tank. The pump is controlled by floats hung in the main equalization tank. The floats send wastewater level information to the programmable logic controller (PLC) which controls the overall processing of the wastewater. When the pump is energized the wastewater is pumped back to the filtration room in the building (for double batch tank systems) or directly to the batch tank (on single batch tank systems).

The wastewater from the equalization tank 80 is transferred into underground batch tank 85 for chemical coagulant treatment. On large volume sites, there may be a dual batch tank system with automatic control valving inside the facility to direct the wastewater to the then in use batch tank. When the batch tank 85 is full, a recirculation mode begins wherein the wastewater from the batch tank is pumped into the building, pH adjusted, and then dosed with a coagulant solution.

The wastewater from the batch tank 85 is pumped into the filtration room within the building to the main process pipe loop. The main process loop is equipped with two chemical injection points and a pH sensor. For dual batch tank systems, the end of the processing loop is equipped with a 3 way electrical control valve to direct the wastewater to the correct batch tank. The control valve is controlled by the PLC. One chemical injection point is for the introduction of, by way of example, caustic. Concentrated caustic is typically used as it is readily available and does not adversely effect downstream processes. A 12 GPD chemical feed pump is typically used. The caustic is introduced to the pipeline during the first phase of the recirculation cycle of the batch process. The second chemical feed point is for the introduction of the coagulant during the second phase of the recirculation process. A 60 GPD pump is typically used. The pH sensor is located and piped such that wastewater upstream of both injection points is routed to the pH sensor. This is so the pH sensor evaluates the wastewater that has been recirculated and mixed with the wastewater in the batch tank. There are high and low pH level relays in the pH controller that are wired to the PLC. The PLC controls the caustic and coagulant feed pumps based on the input it receives from the controller.

Batch tank 85 is underground, reinforced concrete tank in which the main chemical treatment process occurs. The tank 85 typically has an operating volume of approximately 6,800 gallons and a depth from grade not exceeding 15 feet. The bottom is sloped to help channel the residual sludge to the sludge pump during the final phase of the batch process. The tank has (1) 3" dia. inlet pipe from the main pipe loop, (1) 3" dia. outlet pipe to the main process loop, (1) 2" fresh air vent, (1) 2" outlet pipe to the sludge tank, and (1) 2" outlet pipe from the floating suction arm assembly to the self priming centrifugal pump 106 within the filtration room. In addition, the tank has (1) submersible pump 87 used to pump the contents of the tank into the filtration room for chemical dosing/recirculation, (1) submersible pump 101 for pumping the residual sludge out of the batch tank, and (1) floating arm suction assembly 107 fabricated so as to allow decantation of the clarified wastewater from approximately 3" below the upper surface of the wastewater. All of the pumps are controlled by floats within the batch tank that relay information to the PLC where it is processed and ultimately the PLC controls the batch process. The floating suction arm 107 is made of non-corrosive materials. The arm 107 is equipped with stainless steel aircraft cable which is connected to an anchor eyebolt disposed at the top of the tank manway to permit the installer to set the stop depth of the arm. The stop depth is coordinated at start-up with the various floats, operating volume of the tank, and sludge volume, all of which remain fairly constant. Sealing of the batch tank to render it watertight is imperative so that currents are not generated within the tank during the settling phase of the batch process. Depth and placement of the batch tank is important as the self priming centrifugal pump used to decant the batch tank has limited suction lift. The residual sludge is pumped to an on site underground holding tank 102 until it is subsequently pumped out and disposed of off site at a disposal facility.

After the batch has been coagulant dosed, the recirculation mode stops and the batch is permitted to settle for approximately 2–3 hours. Upon completion of the settling phase of the batch process, the PLC energizes a self-priming centrifugal pump 106 located within the filtration room. For dual batch tank systems, there is a 3 way valve to control which batch tank is decanted. The PLC controls the position of the 3 way valve. The suction pipe of the pump is equipped with check valves in the filtration room and at the batch tanks to minimize the amount of air present in the piping system. The discharge from the self-priming pump is routed to a centrifugal pump (when necessary) used to boost the pressure of the pipeline. The pressure is boosted to a level wherein the wastewater flows at the desired rate through the subsequent filtration equipment to it's final discharge point The discharge from the pressure boosting pump enters the cartridge filter housing 109. The size of the cartridge housing is dependent upon the volumetric flow rate of the pump, the frequency at which the owner desires to maintain the cartridges, and the practical aspects of removing fouled cartridges for cleaning or replacement. Typically (8) double length Harmsco cartridges within a single Harmsco housing are used. The cartridges can be rated between 50 and 1 micron with 20 being typically used in most applications. This filtration serves as the third means of suspended solids removal. The micron size of 20 was chosen based on providing an acceptable wastewater quality for the downstream filter elements, maximizing the run time between cartridge maintenance, minimizing the head pressure required to pump the wastewater through the filter housing, and cartridges with smaller micron sizes typically cannot be cleaned and reused to the extent that a 20 micron cartridge can. As such, the cost associated with cartridge replacement is minimized while still providing an acceptable product. In addition, the main function of the cartridge filter 109 is to remove suspended floc that is decanted from the batch tank 85. The floc particles are typically larger than 20 microns in size and form a film on the cartridge that aids the filtration process and causes the cartridge filters to filter out particles smaller than 20 microns in size while still cleaning up well with a common garden hose. The discharge from the cartridges housing is transferred to the ion exchange filter or resin bed 92. The purpose of the ion exchange filter 92 is to remove the residual MBAS (soaps) and organics to provide an acceptable final effluent for discharge to the environment. The selection of ion exchange material is most important. The most effective form of ion exchange resin proven to work in the present invention, meaning that it removes the MBAS and then liberates the collected MBAS during a cleansing process, is a weak base anion resin such as that manufactured by Resintech, Inc. The amount of resin used is principally dependent upon the flow rate and depth of bed. Typical volumes are 2 gallons per minute per cubic foot of resin. Depending upon the size of the system one, two or more tanks may be necessary. Dual systems typically utilize two 36" diameter x 6' tall tanks and single systems utilize one such tank. The tank has internal components to aid proper dispersion of the wastewater into the tank, proper cleansing of the resin bed, and containment of the resin beads from being carried out of the tank by the water flowing through it. The resin beds are periodically cleaned. The cleaning process utilizes a combination of water, acid, and caustic in varying concentrations and durations. The frequency of cleaning is dependent upon the volume of wastewater put through the tank and the level of containments in that wastewater. The cleaning process is conducted by a series of valves that are all automatically controlled. Initiation of the cleaning process can be done by the facility operator or the PLC will initiate the process at a predetermined gallonage volume. The cleaning solution is collected in an on-site underground holding tank until it is subsequently pumped out and disposed of off site at a disposal facility. The effluent from the ion exchange vessel is routed to its final discharge point or to a subsequent filtration process and holding tank system when recycling of the wastewater is desired. Prior to reaching either destination the wastewater is pH adjusted to approximately 7. The adjustment is made by a pH controller with a sensor in the pipeline from the ion exchange vessel(s) and a caustic pump energized by the pH controller directly. Typically a 6 gallon per day pump is used. In some cases, the resin adsorption step stated above may be eliminated as the soaps will be used to wash the vehicles again, thereby minimizing the cost of buying soap and the costs associated with removing them.

For some locations, it is desirable to recycle and reuse a part or all of the wastewater stream to wash the vehicles. Depending upon the specific use, subsequent filtration may be performed. The subsequent processes include carbon adsorption (optionally) 99a, membrane separation, deionization, ultraviolet light, and/or ozonation 99 by way of example.

The entire process is controlled by a PLC (programmable logic controller) with a custom program developed through this company. The PLC takes input information from various floats and sensors throughout the system, analyzes the status, and operates the various pumps and valves necessary for automatic processing of the wastewater. In addition, the system is equipped with various flow sensors throughout the piping such that the PLC is able to trouble shoot and detect a variety of common mechanical malfunctions, warn the facility operator, and described the problem to the facility operator. Furthermore, if desired by the operator, the PLC can include an optional subroutine wherein the sludge holding tank is periodically, automatically decanted using a floating suction arm and self priming pump to remove clarified wastewater from the sludge tank and reintroduce it to the lint trap to minimize the cost of pumping out the sludge tank (clarified wastewater is inherently pumped to the sludge tank as part of the sludge from the batch tank). The automatic decant system includes a photo optic sensor to detect when floc laden water is decanted and the self priming pump is automatically shut off Suitable caustic agents to effect the first pH include sodium hydroxide, calcium hydroxide, slaked lime and the like. It is important that the caustic agents be supplied to the system in moderate concentrations of less than about 25% by weight. These moderate concentrations permit accurate first pH levels.

Suitable acidifying agents to effect the first pH include, by way of example, sulfuric acid, muriatic acid, and nitric acid. It is likewise important that the acidifying agent be supplied to the system in moderate concentrations of less than about 10% by weight. These moderate concentrations permit accurate first pH levels.

Suitable coagulants pursuant to the present invention are generally those which acidify the caustified wastewater to the afore-discussed moderately elevated pH at which there is effective coagulation. It has been found that metal-halo coagulants and their derivatives are useful including wherein the metal is preferably Al and the halide is Cl, Br or I or mixtures thereof and preferably Cl. The preferred metal-halo coagulants are polyaluminum chlorides (PAC), aluminum chlorohydrates, and polyDADMAC, and polymer mixtures or derivatives thereof The most preferred coagulant is polyaluminum chloride (PAC). PAC solutions are commercially available in broad ranges of polymerization with basicities ranging from above zero up to 83%. It has been found, however, that a PAC with a basicity of 45 to 50% is most preferred. It has also been found that a PAC with extremely low sulfates of less than 100 ppm is most preferred and may prevent interference with the weak base anion exchange resin reaction. It is also most preferred that the PAC be essentially free of Fe as this will cause corrosion and discoloration, which discoloration must be avoided particularly where the treated water is recycled as feedwater. An afore-described most preferred PAC is commercially available from Geo Specialty Chemicals, Little Rock, Ark.

The above-described apparatus provides a part batch treatment method which however effectively provides essentially continuous treatment and possible recycle of commercial car wash wastes. The continuously treated water meets the aforesaid rigorous environmental criteria for ground water discharge. The method provides an essentially continuous operation, with minimal downtime and maintenance, which maintenance is readily and simply achieved such as by regular but infrequent filter cleaning or replacement, and sludge removal.

Since other modifications and changes varied to fit particular operating requirements and environment, will be apparent to those skilled in the art, the invention is not considered limited to the example chosen for purposes of disclosure, and covers all changes and modifications which do not constitute departures from the spirit and scope of this invention.

It will be appreciated that modifications may be made in the system and apparatus described hereinabove in keeping within the scope of the present invention, as defined in the appended claims.

What is claimed is:

1. A method of treating wastewater effluent from a car wash comprising:
   (a) adding one selected from a caustic agent and an acidifying agent to wastewater to a first predetermined pH;
   (b) adding a PAC coagulant to the wastewater at said first pH to effect a second predetermined pH, and allowing coagulation of the wastewater at said second pH to form a sludge and treated water; and
   (c) separating the treated water from the sludge.

2. The method of claim 1, wherein the second pH is less than the first pH.

3. The method of claim 2, wherein the second pH is about 6.2 to 7.0.

4. The method of claim 3, wherein the first pH is up to 10.0.

5. The method of claim 1, wherein the second pH is 6.6 to 7.0 and the first pH is 8.2 to 8.6.

6. The method of claim 4, further comprising equalizing the effluent before step (a), and (d) filtering the treated water from step (c) to remove from about 1 to 50 micron particles.

7. The method of claim 6, further comprising (e) acidifying the filtered water from step (d) and (f) passing the acidified water from step (e) through a weak base anion exchange resin.

8. The method of claim 7, wherein the treated water from step (f) comprises;

| Substance | Maximum Allowable Concentration (micrograms/liter) |
|---|---|
| Barium | 2,000 |
| Cadmium | 20 |
| Chromium (hexavalent) | 100 |
| Copper | 1,000 |
| Foaming agents (MBAS) | 1,000 |
| Iron | 600 |
| Lead | 50 |
| Manganese | 600 |
| Nickel | 2,000 |
| Oil and Grease | 15,000 |
| pH | 6.5 to 8.5 |
| Zinc | 5,000 |

9. The method of claim 7, wherein the treated water from step (f) comprises:

| Volatile Organic (VOC) | Maximum Allowable Concentration (parts per billion, ppb) |
|---|---|
| Toluene | 5 |
| Xylene (per monomer) | 5 |
| Ethylbenzene | 5 |
| Benzene | 0.7 |

10. The method of claim 7, wherein the wastewater effluent to step (a) comprises about;

| Substance | Concentration Ranges (parts per million, ppm) |
|---|---|
| MBAS | 3–40 ppm |
| TSS | 50–250 ppm |
| Oil and Grease | 10–200 ppm |
| pH | 7–9.5 |

-continued

| Substance | Concentration Ranges (parts per million, ppm) |
|---|---|
| Barium | 0.15–0.30 ppm |
| Lead | 0.02–0.30 ppm |
| Chromium | 0.05–0.30 ppm |
| Cadmium | 0.02–0.15 ppm |
| Manganese | 0.10–2.0 ppm |
| Copper | 0.10–0.40 ppm |
| Zinc | 0.30–3.0 ppm |
| Iron | 0.50–20.0 ppm |
| Volatile Organics (VOC) | 300–600 ppm total |

11. The method of claim 8, further comprising sanitizing the treated water to remove bacterial matter, and recycling the treated water as feedwater.

12. The method of claim 5, wherein the PAC is at 400 to 600 ppm.

13. The method of claim 6, said equalizing further comprising holding said effluent in a first tank for at least about ½ hour.

14. The method of claim 13, further comprising transferring the wastewater from the first tank to a second tank, and adding said caustic agent first and then said coagulant in said second tank.

15. The method of claim 14, where the coagulating is for about 2 to 3 hours.

16. The method of claim 1, wherein the PAC comprises a basicity of from about 45 to 50%.

17. A method for treating wastewater effluent from a car wash comprising; adding one selected from a caustic agent and an acidifying agent to the wastewater to a first predetermined pH of 8.2 to 8.6, and then adding an acidifying coagulant comprising a PAC to effect a second predetermined pH of 6.6 to 7.0, sensing the pH of the wastewater with the added coagulant, and stopping adding the coagulant when the wastewater is sensed at said second pH, and allowing coagulation of the wastewater to form a sludge and treated wastewater, and separating the treated wastewater from the sludge.

* * * * *